(12) United States Patent
Tucker

(10) Patent No.: US 11,975,280 B2
(45) Date of Patent: May 7, 2024

(54) OIL SEPARATOR

(71) Applicant: Jay Richard Tucker, Chesapeake, VA (US)

(72) Inventor: Jay Richard Tucker, Chesapeake, VA (US)

(73) Assignee: Jay Richard Tucker, Chesapeake, VA (US)

( * ) Notice: Subject to any disclaimer, the term of this patent is extended or adjusted under 35 U.S.C. 154(b) by 119 days.

(21) Appl. No.: 17/162,883

(22) Filed: Jan. 29, 2021

(65) Prior Publication Data
US 2022/0241707 A1    Aug. 4, 2022

(51) Int. Cl.
*B01D 35/30*      (2006.01)
*B01D 46/24*      (2006.01)

(52) U.S. Cl.
CPC ............. *B01D 35/30* (2013.01); *B01D 46/24* (2013.01)

(58) Field of Classification Search
CPC ...... B01D 35/30; B01D 46/24; B01D 46/003; B01D 46/0041; B01D 46/2403
USPC ......... 210/263, 130, 97, 424, 429, 440–444, 210/416.4, 167.05, 194, 196, 167.01
See application file for complete search history.

(56) References Cited

U.S. PATENT DOCUMENTS 4,316,801 A * 2/1982 Cooper ................ B01D 35/153
210/90

* cited by examiner

*Primary Examiner* — Madeline Gonzalez
(74) *Attorney, Agent, or Firm* — Clayton, McKay & Bailey, PC

(57) ABSTRACT

An oil separator includes a container and a filter assembly. The filter assembly can include a casing, a valve guide, and a valve body. First and second chambers can be defined by a lower casing body. The valve guide can guide the valve body's movement between first and second positions in the first chamber or the second chamber. A first valve can be closed by a prong of the valve body in the first position such that unfiltered fluid enters an inlet of the oil separator, waste byproducts collect in a reservoir defined by the container, and filtered fluid is output from an outlet. The valve body can move from first to second positions with an accumulation of byproducts in the reservoir. In the second position unfiltered fluid may pass from the inlet to the outlet.

8 Claims, 11 Drawing Sheets

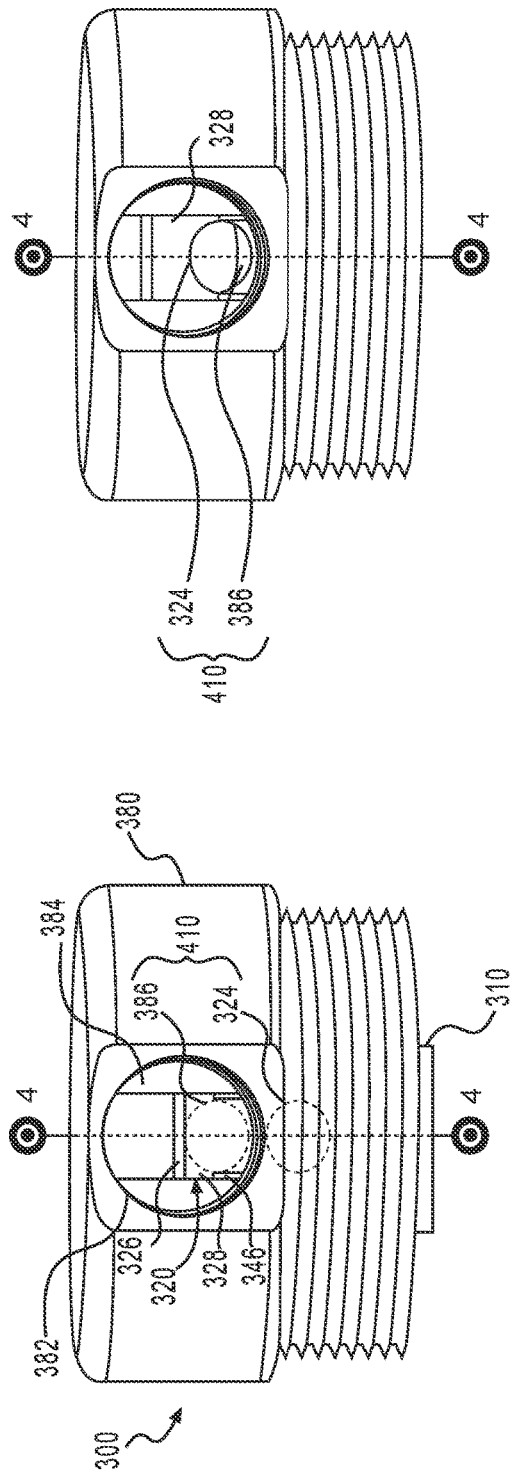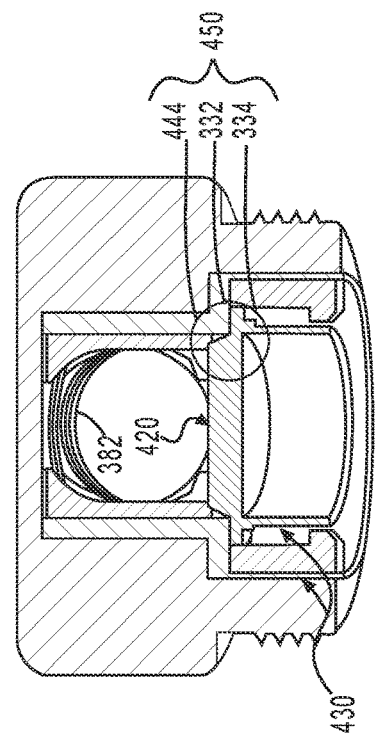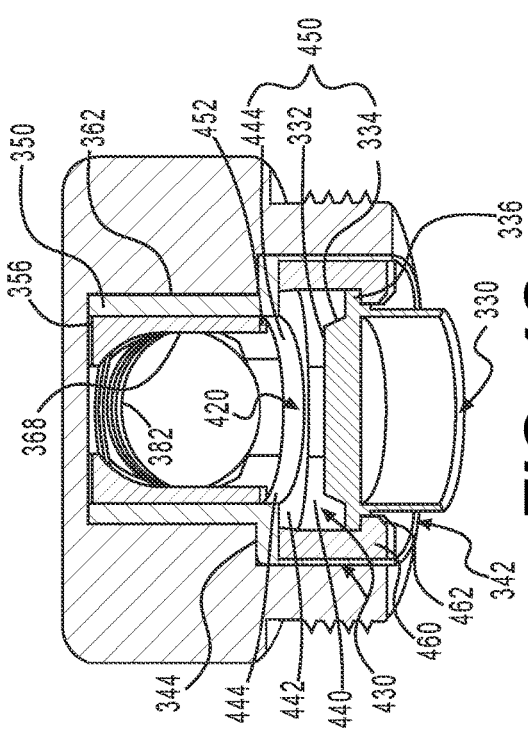

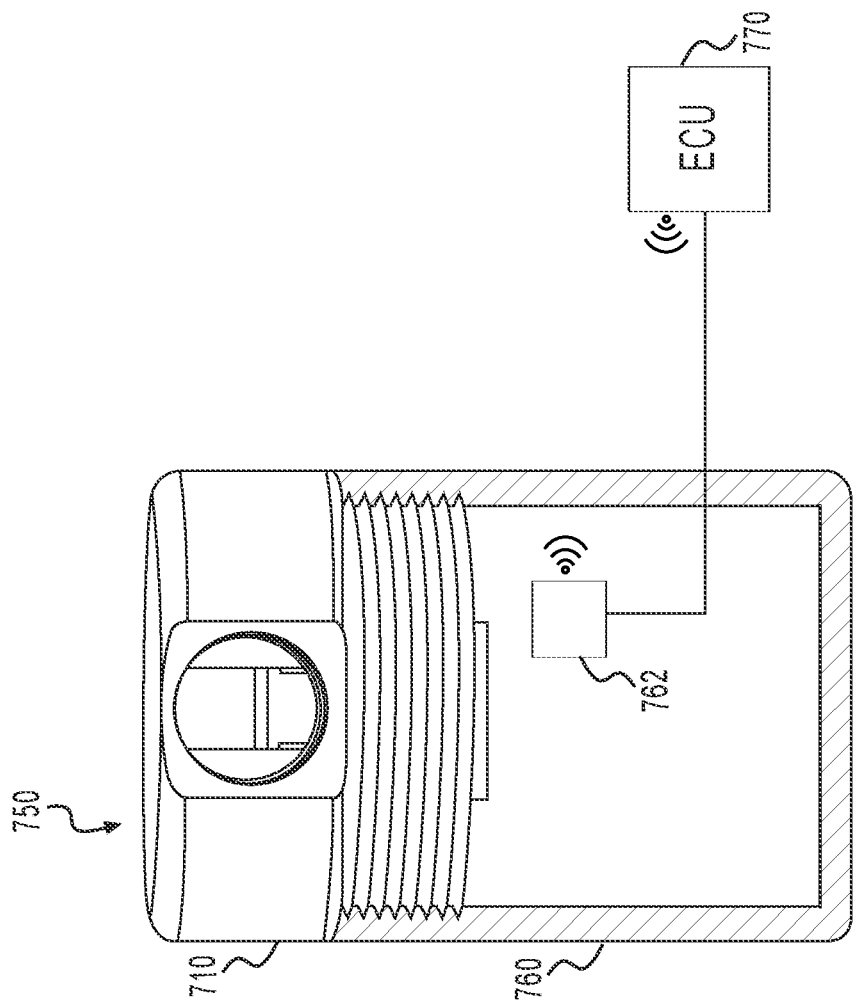
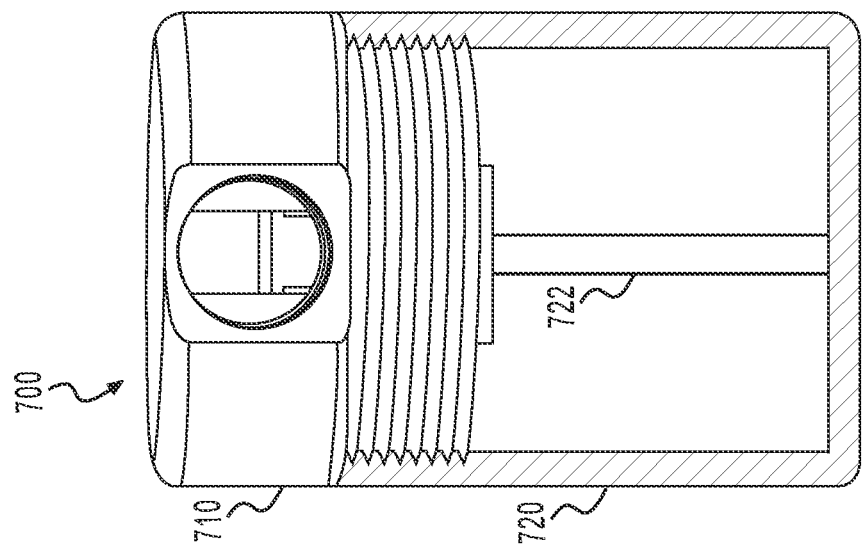
*FIG. 7A*
*FIG. 7B*

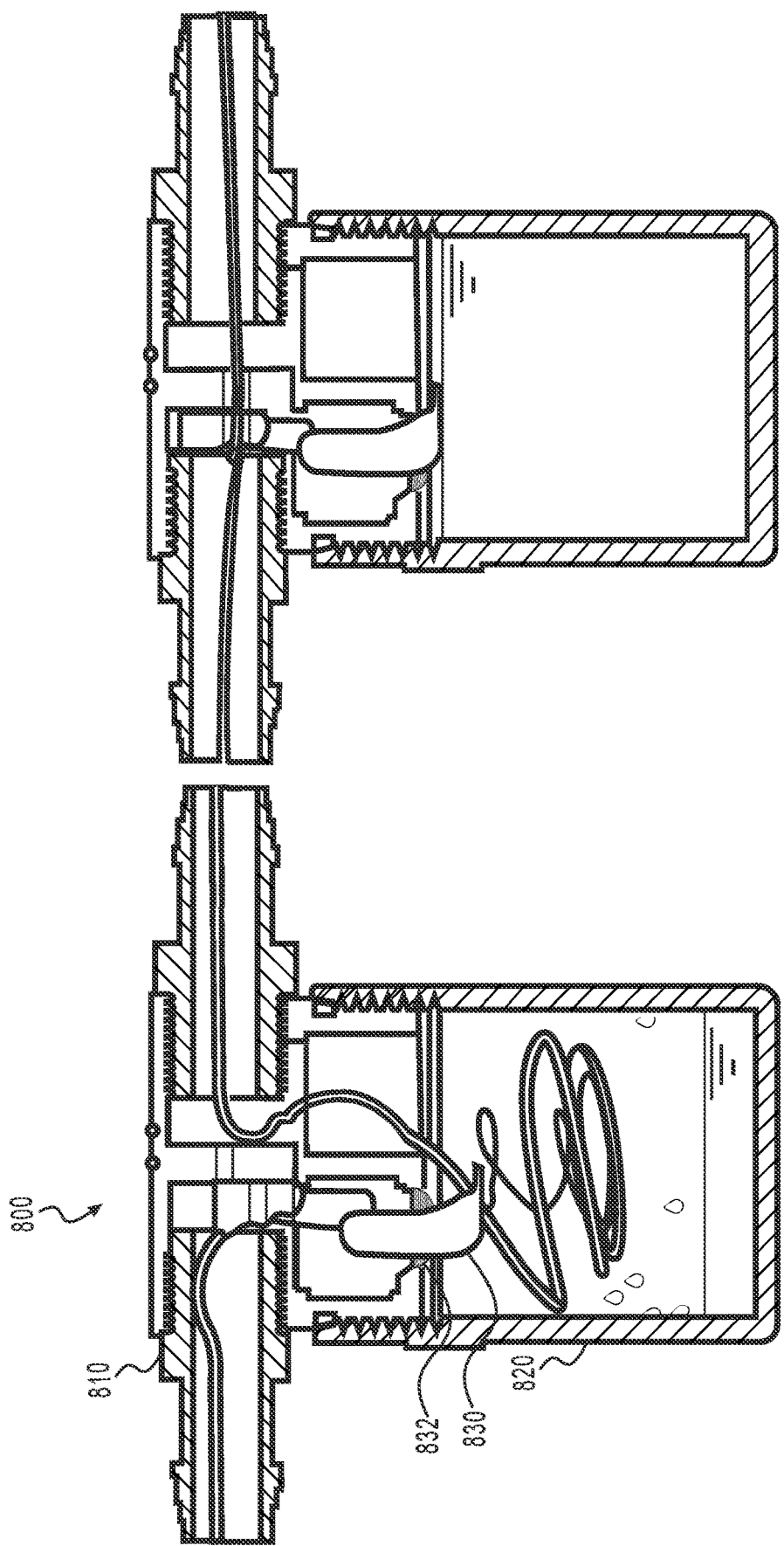

OIL SEPARATOR

BACKGROUND

Normal operation of an internal combustion engine can result in burnt exhaust gases traveling from combustion chambers, past piston rings, and into an internal structure (e.g., a crankcase) of the engine. This is known by some as "blow-by" gas. To release the positive pressure that blow-by gas creates within the internal structure, and avoid rupturing oil seals, an engine may be equipped with a positive crankcase ventilation ("PCV") valve. Release of this positive pressure within the crankcase can improve or maintain efficient operation of an engine since the motion of cams and pistons are not opposed by increased pressure in the crankcase. In operation, an engine's waste byproducts that blow past the piston rings and travel throughout the engine can be directed to a PCV valve through a hose. From an outlet of the PCV valve, these waste byproducts can be directed into an intake manifold to be mixed with incoming air.

While the above-mentioned configuration provides adequate results for engines that have been run for less than 30,000 miles, it poses serious issues for direct injection engines that are incorporated in many vehicles currently in use and being produced. This is because delivering air mixed with blow-by gas to combustion chambers of an engine can contribute to carbon build up on intake valves that control air flow to the combustion chambers. Direct injection ("DI") engines inject fuel directly into combustion chambers with fuel injectors that, by and large, do not serve the dual purpose provided by fuel injectors of other engine configurations of cleaning valves for combustion chambers, in addition to injecting fuel. More specifically, DI fuel injectors are typically not positioned so that the fuel they inject sprays the backs of valves (e.g., air intake valves) that control air intake into the combustion chambers where fuel is injected. This has the effect of cleaning the valves. Thus, the absence of this operation in DI engines over time can lead to carbon building up on those valves.

Buildup on valves for combustion chambers as mentioned above often results in drops in valve sealing, valve face aerodynamics, and intake port flow efficiency. These valve issues can combine for a large drop in overall efficiency in engine operation, which can affect gas mileage, horsepower, engine longevity, as well as environmental emissions. Car makers in the past, having recognized the issue of carbon buildup in DI engines, have advised consumers to use only specific types of detergent gasolines that do not include ethanol additives. Another suggestion by car makers has been to periodically add a fuel-system cleaner to vehicles. However, there are countries, including the United States, which impose regulations that require ethanol be added to, for example, highway bound gasoline. Many of these countries, including the United States, in fact require ethanol to make up some minimum percentage of highway bound gasoline. Thus, following the recommendations of car makers is not feasible or even possible for many drivers of vehicles with DI engines.

In addition to carbon buildup, blow-by and other waste products can reduce an engine's efficiency in vehicles with higher miles due to piston wear. Piston wear can allow more exhaust gases flowing from a PCV valve to enter an intake manifold, and pose significant issues for the environment. Higher mileage engines are often in older vehicles that have older catalytic converters and various emissions systems in place. These components are ill-equipped to handle increases in blow-by gases, which can cause, for example, a catalytic element to burn out faster and a vehicle to produce more smog. Thus, the vehicle in this example is more likely to (1) fail smog tests, (2) require a vehicle owner to purchase replacement parts (e.g., catalytic converter), and (3) result in additional waste (e.g., the burnt our converter) that impacts the environment.

As a result, a need exists for devices and methods that enable an engine to operate more efficiently by reducing the amounts of caustic gases, oil vapor, and various acids the engine must burn. In addition, a need exists for a solution that provides an adequate level of efficient engine operation once an oil separator has reached its holding capacity, without a risk of hydro-lock in a hard turn or increased emissions due to liquid oil getting into an intake manifold.

SUMMARY

Examples described herein include systems and methods for separating contaminants from fluid. In one example, a filter assembly can include a casing and a valve body. The casing may include a head, an end face, a lower casing body extending between the head and the end face, and a partition wall. In one example, the lower casing body defines a first chamber and a second chamber on opposite sides of the partition wall. In another example, the valve body is disposed in the first chamber or the second chamber, and includes a base and a prong extending from the base. In another example, the valve body is configured to move within the filter assembly from a first position to a second position to open a first valve defined in the head of the casing. According to an aspect of the present disclosure, the first valve is closed relative to the one of the first chamber and the second chamber in which the valve body is disposed, with the valve body in the first position and the second position.

An oil separator includes a container and a filter assembly. The filter assembly can include a casing, a valve guide, and a valve body. First and second chambers can be defined by a lower casing body. The valve guide can guide the valve body's movement between first and second positions in the first chamber or the second chamber. A first valve-port may be closed by a prong of the valve body in the first position such that unfiltered fluid enters an inlet of the oil separator, waste byproducts collect in a reservoir defined by the container, and filtered fluid is output from an outlet. The valve body can move from first to second positions with an accumulation of byproducts in the reservoir. In the second position unfiltered fluid may pass from the inlet to the outlet.

In another example, an oil separator is provided that is suitable for use with an internal combustion engine and includes a container and a filter assembly. The container may include a first end that is open and a second end that is closed, and define a reservoir between the first end and the second end. In one example, the filter assembly can be secured to the first end of the container and includes a casing and a valve body. The casing may include a head, an end face, a lower casing body extending between the head and the end face, and a partition wall. In some examples, the lower casing body defines s a first chamber and a second chamber on opposite sides of the partition wall. In addition, according to an aspect of the present disclosure the valve body may be disposed in the first chamber or the second chamber, and include a base, a prong extending from the base, and first engagement members. In still other examples, the valve body may be configured to move within the filter assembly from a first position to a second position to open a first valve defined in the head of the casing. According another aspect of the present disclosure, the first valve may be closed by the prong in the first position such that the reservoir is in fluid communication with an inlet of the oil separator through a port defined in the end face of the filter assembly and the first chamber or the second chamber.

Both the foregoing general description and the following detailed description are exemplary and explanatory only and are not restrictive of the examples, as claimed.

BRIEF DESCRIPTION OF THE DRAWINGS

FIGS. 4A and 4B respectively illustrate side elevation views of an outlet of an exemplary filter assembly.

FIGS. 4C and 4D illustrate sectional views of the exemplary filter assembly of FIGS. 4A and 4B, respectively taken along section line 4-4.

FIG. 7A illustrates an exemplary oil separator, according to an aspect of the present disclosure.

FIG. 7B illustrates an exemplary oil separator, according to an aspect of the present disclosure.

FIGS. 8A and 8B illustrate an exemplary oil separator in first and second operational states, according to an aspect of the present disclosure.

DESCRIPTION OF THE EXAMPLES

Figure 1A:
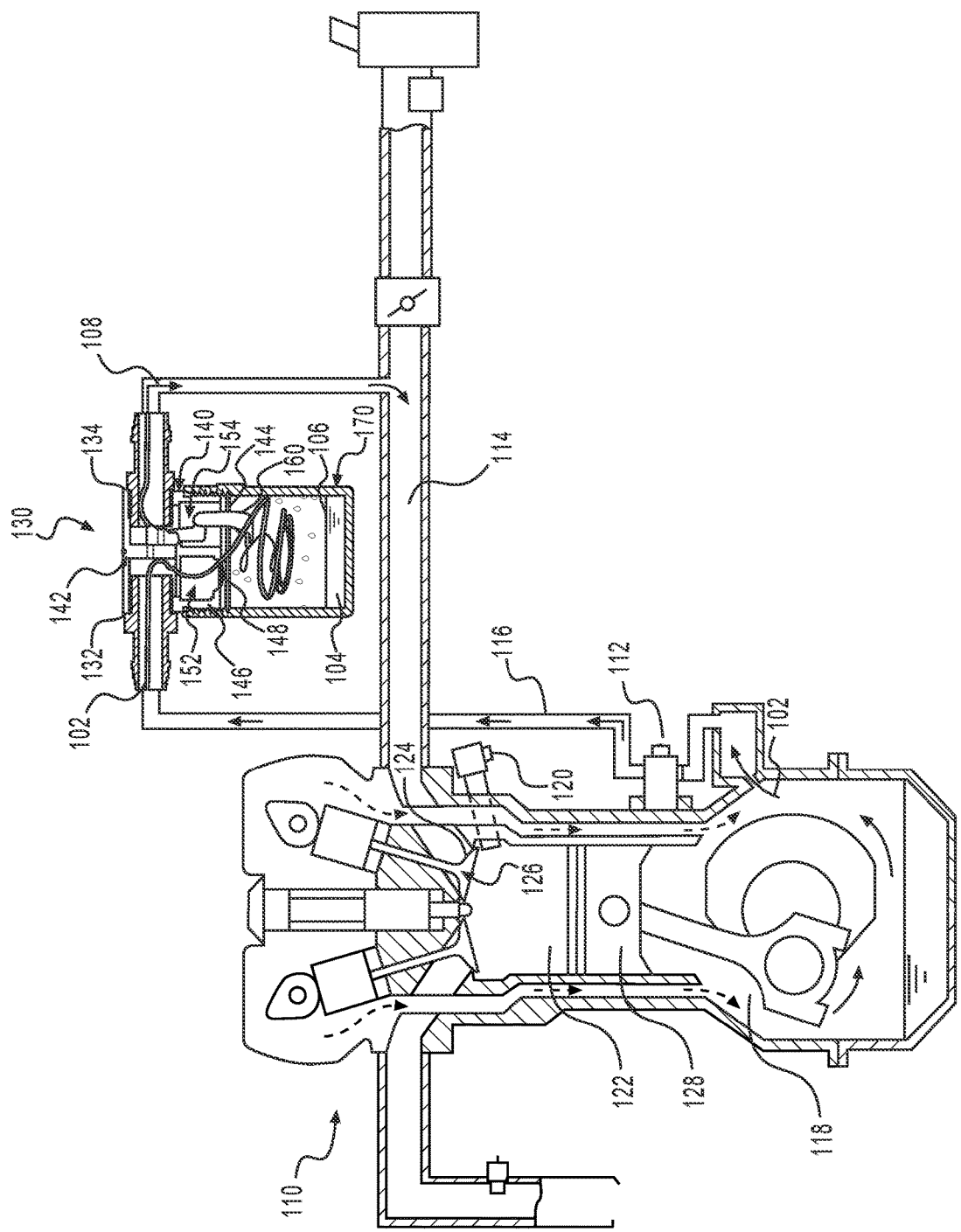
FIGS. 1A and 1B illustrate an internal combustion engine incorporating an exemplary oil separator according to an aspect of the present disclosure.

Reference will now be made in detail to the present examples, including examples illustrated in the accompanying drawings. Wherever possible, the same reference numbers will be used throughout the drawings to refer to the same or like parts.

Examples described herein are directed towards an oil separator that can include a container and a filter assembly. The filter assembly can include a casing and a valve body. The casing can include a head, an end face, and a lower casing body extending between the head and the end face. The lower casing body can define first and second chambers. The valve body can be positioned in the first chamber or the second chamber. In addition, the filter assembly can include a valve guide to guide the valve body's movement between first and second positions within the first chamber or the second chamber.

In one example, the valve body includes a first base and a prong that extends from the first base to a respective top edge or end-tab. A first valve may be defined within the head by: (1) a first through-port defined by a portion of a partition wall of the filter assembly that extends through the head; and (2) a second through-port defined by the prong between the first base and the end-tab. During normal operation, the first valve-port may be closed by the prong with of the valve body in the first position. As a result, unfiltered fluid can enter an inlet (a first port of a filter assembly) of the oil separator, pass through a filtering element, and waste byproducts can be ejected by a second port provided by the end face of the filter assembly.

At the same time waste byproducts may be collecting in a reservoir defined by the container, the now-filtered fluid may pass from the second port through the container and into a third port defined in the end face. Furthermore, the filtered fluid can pass from the third port through the first or second chamber including the valve body, and out of the exemplary oil separator through a respective outlet (a fourth port of the filter assembly).

Over time, waste byproducts can accumulate and fill the reservoir defined by the container. Continued accumulation from an amount slightly less than a volume of the container to an amount in excess of that volume can cause the valve body to move from the first position to the second position. In the second position unfiltered fluid may pass from the inlet of the oil separator, through a now open first valve in the head, and on to the outlet of the oil separator. In one example, movement of the valve body into the second position places the second through-port into alignment with the first through-port such that the inlet is in direct fluid communication with the outlet.

The inlet of the oil separator may normally be in fluid communication with the first chamber defined by the lower casing body, whereas the second chamber may normally be in fluid communication with the outlet of the oil separator. In the second position of the valve body, a third valve-port provided in the head of the filter assembly is closed. The third valve-port may be provided between the outlet and the second chamber where the valve guide and body are provided in the second chamber. On the other hand, the second valve is provided between the first chamber and the inlet of the oil separator in a configuration in which the valve body are provided in the first chamber. As one of ordinary skill in the art will recognize, in the first position, the first valve is closed and the second valve is open, whereas in the second position, the opposite is true.

Figure 1B:
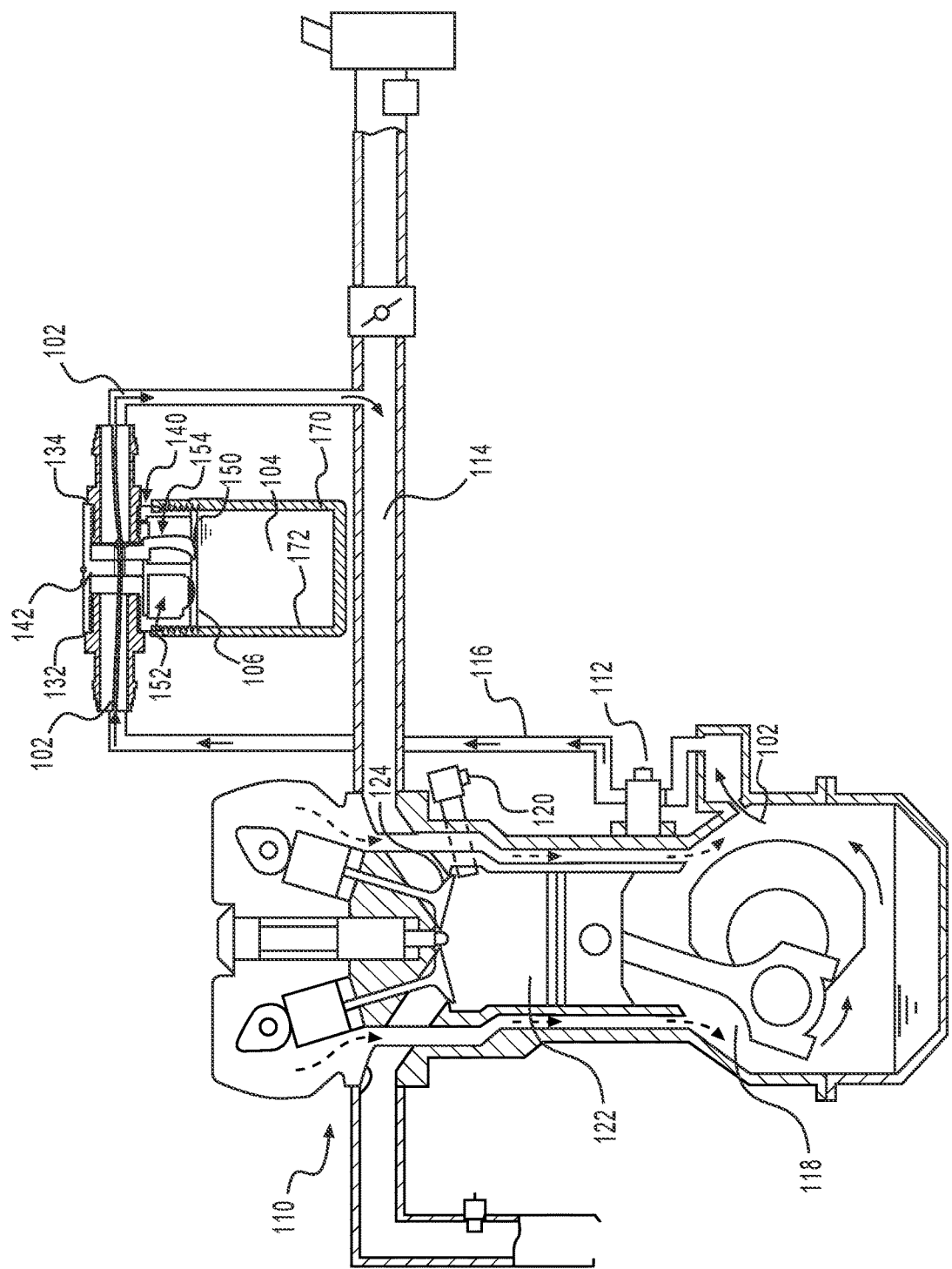

FIGS. 1A and 1B illustrate an internal combustion engine 110 ("engine 110" or "DI engine 110") incorporating an exemplary oil separator 130 that includes a filter assembly 140 and a container 170 according to an aspect of the present disclosure. The filter assembly 140 includes a casing including a head 142 that defines an upper casing body, an end face 144, and a lower casing body 146 extending from the head 142 to the end face 144. A filtering element 148 is provided at the end face 144 at or below a bottom portion of a first chamber 152 defined by the lower casing body. The lower casing body 146 further defines a second chamber 154 on a opposite side of a partition wall from the first chamber 152. A valve body 160 is moveably disposed in the second chamber 154 of the filter assembly 140.

With reference to FIG. 1A, during operation, unfiltered fluid 102 (e.g., gas) exits the engine 110 through a positive crankcase valve 112 ("PCV 112"). The unfiltered fluid 102 may be composed of a mixture of air and waste byproducts (e.g., oil, fuel, acid, etc.). The unfiltered fluid 102 enters the oil separator 130 through an inlet 132. Moving from the inlet 132, then into and through the first chamber 152, the unfiltered fluid 102 will encounter and pass through the filtering element 148 of the oil separator 130, as described in more detail with reference to FIGS. 2A and 2B.

Liquid 104 formed from the condensing contaminated vapor moves from the filtering element 148 and is ejected out of first chamber 152 towards walls 172 of the container 170. The liquid 104 that is formed from the unfiltered fluid 102 passes through the filter element 148 and is ejected from the first chamber 152 to prevent the liquid from getting pulled into a port that is downstream of the first chamber 152 and the container 170.

As the liquid 104, which includes waste byproducts, is extracted and pools in a reservoir defined by the container 170, filtered fluid 108 exits the container 170. More specifically, the filtered fluid 108 travels up through the container 170, past the valve body 160 into the second chamber 154, and out of an outlet 134 of the oil separator 130. The filtered fluid 108 exiting the oil separator 130 through the outlet 134 is then conveyed into an intake manifold 114 of the engine 110.

As shown, the exemplary oil separator 130 illustrated in FIG. 1A can be installed in the conduit 116 that runs from the PCV 112 to the intake manifold 114. Further, the oil separator 130 can deliver filtered fluid 108 that is composed of substantially less waste byproducts than that of blow-by gas from a crankcase 118 that is released by the PCV 112. Exemplary oil separators described herein, such as the oil separator 130 illustrated in FIG. 1A, filter out waste byproducts from fluid exiting a PCV upstream of an intake manifold. Accordingly, the oil separator 130 delivers filtered (cleaner) fluid (air) to the engine 110 by separating oil and other waste byproducts from intake air prior to it entering the engine 110. The engine 110 will operate more efficiently as a result of not having to burn caustic gases, oil vapor, and various acids.

This is particularly advantageous for DI engines because fuel injectors, like a fuel injector 120 of the DI engine 110 illustrated in FIG. 1A, inject fuel directly into combustion chambers such as a combustion chamber 122 shown in FIG. 1A. As a result, the backs of intake valves, such as a back 124 of an intake valve 126 of the DI engine 110, are not sprayed by fuel injectors. As previously discussed, this spray of fuel can clean the backs of intake valves, slowing carbon buildup thereon. Thus, if fluid (air) regulated by intake valves is contaminated (e.g., includes a mixture of air and vapor composed of oil, acid, fuel, and other contaminants), a continuous supply of such can cause more rapid accumulation of carbon buildup on the intake valves. However, the exemplary oil separators of the present disclosure deliver fluid to be regulated by intake valves that is substantially less contaminated from blow-by gas, therefore reduce carbon buildup on the intake valve.

Advantages of the filtering capabilities of the exemplary oil separator 130 are discussed above. Not unlike other types of fluid filtering and separating devices, the oil separator 130 has a maximum volumetric capacity for the liquid 104 that can accumulate in the container 170. In these other types of fluid filtering and separating devices, if liquid continues to accumulate beyond a respective capacity, some liquid could find its way into an intake manifold. On the other hand, if flow of blow-by gas from a PCV valve is cutoff, pressure may build in a conduit between the PCV and the other type of device, the PCV, and/or a crankcase of a respective system. If this were to occur, for example with the DI engine 110 illustrated in FIGS. 1A and 1B, the pressure could resist movement of a piston 128 in a crankcase 118 and result in inefficient, or even damaging, operation of the engine 110.

While supplying unfiltered fluid, such as the unfiltered fluid 102 shown in FIGS. 1A and 1B, from a crankcase into an intake manifold is undesirable, it is preferable to either of the scenarios described immediately above. Exemplary oil separators according to the present disclosure avoid both scenarios. More specifically, an oil separator according to the present disclosure, such as the oil separator 130 in FIGS. 1A and 1B, is uniquely configured to transition from a fluid filtering device to essentially another a portion of the conduit 116 when the container 170 accumulates a certain volume of waste byproducts. As explained below, in this configuration, the filter assembly 140 permits substantially unimpeded flow of the unfiltered fluid 102 from the PCV 112 to the intake manifold 114.

The liquid 104 formed from the condensing contaminated vapor is ejected out of the first chamber 152 towards walls 172 of the container 170 as previously explained. As extracted, the liquid 104 falls to the bottom of the container 170 to collect, and a liquid level 106 of the accumulated liquid 104 rises. As the liquid level 106 continues to rise, the liquid 104 will contact a valve body 160 movably positioned in the first chamber 152 and begin to displace the valve body 160 upward from the first position as shown in FIG. 1A.

Figure 2A:
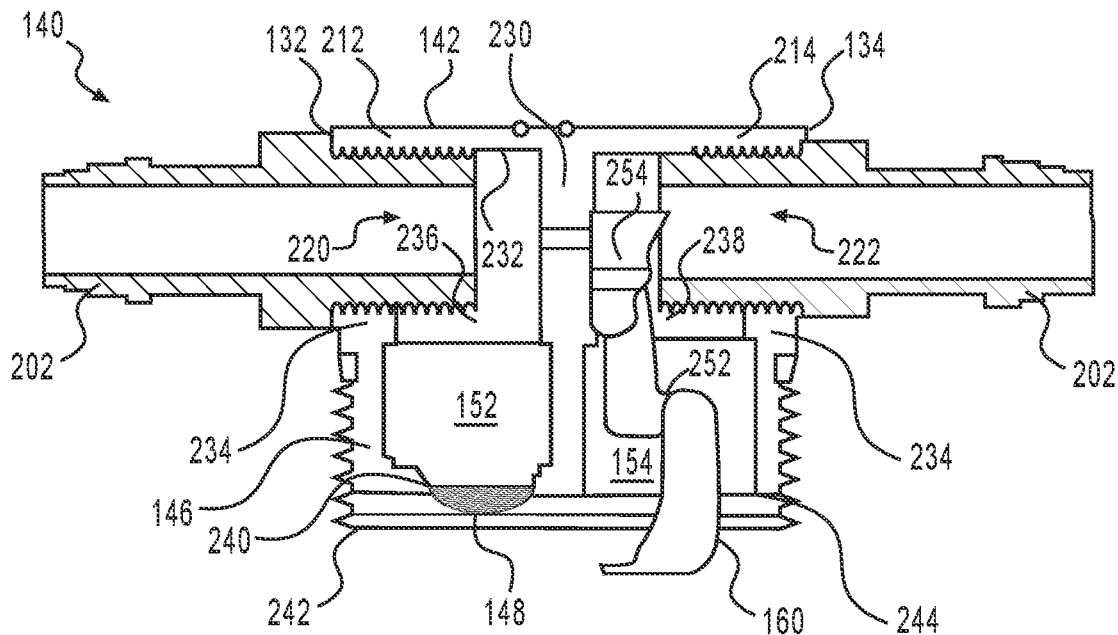
FIGS. 2A and 2B illustrate an exemplary filter assembly for an oil separator in first and second operational states, according to an aspect of the present disclosure.
Figure 2B:
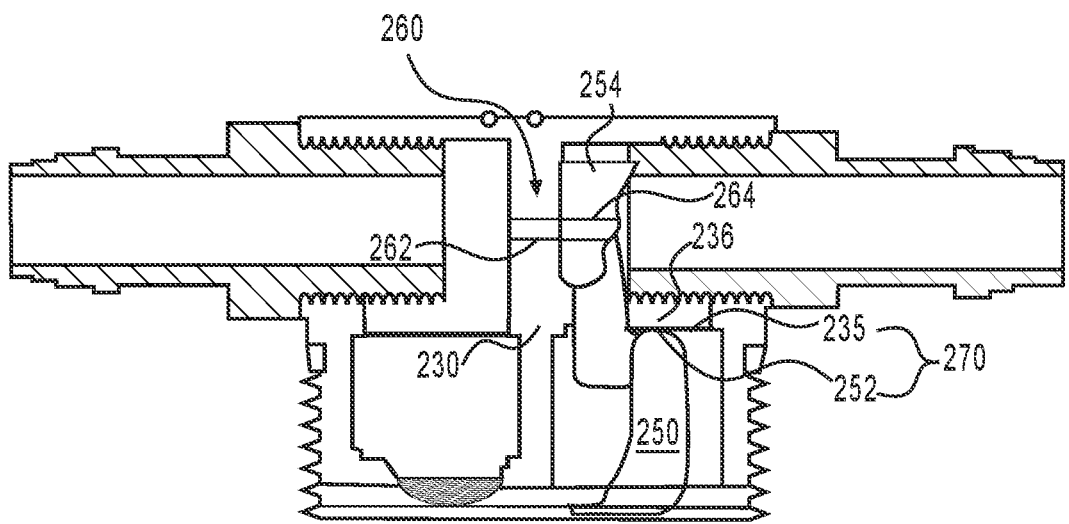

Turning to FIGS. 1B, 2A, and 2B, as the valve body 160 continues to move upward into a second position with continued accumulation of the liquid 104, the valve body 160 will open a first valve 260 (FIG. 2B) and close a second valve 270 (FIG. 2B) and allow fluid to bypass the container 170. Both of the first and second valves 260, 270 are identified and described in detail with reference to FIGS. 2A and 2B. In this bypass configuration, the unfiltered fluid 102 is conveyed directly from the inlet 132 through the first valve 260 to the outlet 134 of the oil separator 130. As a result, pressure due to blow-by gas is still relieved while a filtering operation of the oil separator 130 is bypassed and accumulation of liquid in the container 170 is interrupted.

With the bypass configuration that is illustrated in FIG. 1B and described in more detail with reference to FIG. 2B, unfiltered fluid 102 flows freely straight through the filter assembly 140 as if the oil separator 130 was just another portion of the conduit 116 that is connected to the PCV 112. Thus, the unfiltered fluid 102 does not get filtered and may remain a vapor as it would in current systems that do not include the oil separator 130.

The liquid 104 extracted from the unfiltered fluid 102 is composed of waste byproducts such as oil, acid, and waste fuel vapor, and falls to the bottom of the container 170 to collect until drained. The oil separator 130 may be drained by removing the container 170 from the filter assembly 140 and disposing of the liquid 104 therein. In one example, the container 170 and the lower casing body 146 can be formed with corresponding mating structures (e.g., threaded, interlocking slots, snap fit, etc.). In another example, the container 170 may be additionally equipped with a drain plug that can be removed to drain the oil separator 130, without removal from the filter assembly 140.

A benefit for a system that incorporates the oil separator 130 is that with an average time to fill the container 170 varying from three months to a year, a user can monitor engine health through periodic checks of the liquid level 106 in the container 170. In one example, users may be advised to check the liquid level 106 at every oil change. If there is rapid oil buildup, a user will know that something is wrong with their engine. On the other hand, if the liquid level 106 is very low the user can conclude that a possible reason for the low buildup is that the engine is operating efficiently.

Additionally, with the filter assembly 140, the oil separator 130 is configured to self-implement a built-in bypass and, without any user intervention, open a direct channel (inline with a hose path) that completely circumvents a filtering element, and in some examples, a centrifugal force inducing port. In a case where a user does not check the liquid level periodically, but sporadically or not at all, the oil separator 130 provides a self-regulating device that will allow a system to operate in accordance with systems that lack the oil separator 130. This has the added benefit that if a vehicle is sold, and a new owner does not know to check the oil separator 130, there is no consequence to be found.

FIGS. 2A and 2B illustrate close-up views of the filter assembly 140 in first and second operational states. As illustrated, the valve body 160 is in its first and second positions similar to the illustrations of the valve body 160 in FIGS. 1A and 1B, respectively.

The head 142 of filter assembly 140 includes a first fitting 210 and a second fitting 212 within which first and fourth ports 220, 222 are respectively defined. Each of the first and second fittings 212, 214 is configured to engage with a respective hose connector 202. More specifically, each of the first and second fittings 212, 214 includes an inner surface 216 including a threaded portion configured to engage an outer threaded surface of a respective connector 202 to secure the connector 202 to the head 142. It will be understood that the inner surface or an outer surface of the first and second fittings 212, 214 may be provided with different structural profiles. These structural profiles can be provided according to various arrangements and define various types of connections or fittings suitable for connecting to a connector or directly to a conduit (e.g., tube or hose).

The head 142 may be formed as a cylindrical body and define a partition wall 230 that extends from an upper wall 232 through the head 142 past a lower wall 234 of the head 142. A first intermediate port 236 is defined between the partition wall 230 and the lower wall 234. The first intermediate port 236 is configured to be in fluid communication with the first port 220 and the first chamber 152. On the opposite side of the partition wall 230 from the first intermediate port 236, a second intermediate port 238 is defined to be in fluid communication with the second chamber 154 and the fourth port 222.

In one example, the filtering element 148 may be disposed at the bottom of the first chamber 152 downstream of the first intermediate port 236. As noted above, unfiltered fluid can pass from the first port 220, through the first intermediate port 236, and to the filtering element 148. In one example, the filtering element 148 may be provided with a honeycomb structure and constitute a cooler environment to unfiltered fluid relative to the crankcase 118 of the engine 110, as well as the conduit 116 extending from the PCV 112 to the inlet 132 in FIGS. 1A and 1B. In this example, the filtering element 148 may also constitute a larger surface area relative to the conduit 116. As a result, contaminated vapor within unfiltered fluid may rapidly condense due to rapid compression and slow expansion of a carrier gas within the unfiltered fluid.

In another example, multiple filtering elements may be provided in the oil separator 130 according to the present disclosure. A filtering element may be provided in the second intermediate port 238. In another example, either of the first and second chambers 152, 154 may include a filtering element. In yet another example, a filtering element may extend through a portion of the first intermediate port 236 and the first chamber 152. In still another example, the container 170 (not shown in FIGS. 2A and 2B) may include a filtering element that is positioned immediately downstream of a second port 240 of the filter assembly 140, when the filter assembly 140 is secured to the container 170.

The lower casing body 146 extends from the lower wall 234 of the head 142 to a respective end face 242. An inner wall of the lower casing body 146 defines the first and second chambers 152, 154 on opposite sides of the partition wall 230. The second port 240 and a third port 244 of the filter assembly 140 are formed in the end face 242. In on example, the filtering element 148 and be provided in or at the second port 240. An outer surface of the lower casing body 146 includes a threaded portion configured to engage with a corresponding engagement surface of the container 170 as illustrated in FIGS. 1A and 1B.

The second port 240 may be provided as a directional port. In this example, a process of separation may be further enhanced by a centrifugal force induced within the oil separator 130 by the second port 240. More specifically, liquid may be ejected out of the second port 240 at rapid speed towards walls of a container, such as the walls 172 of the container 170 in FIGS. 1A and 1B, when attached. As a result of the second port 240 having a directional configuration, liquid 104 formed as the unfiltered fluid 102 that passes through the filtering element 148 may be better prevented from getting pulled into a port that is downstream of the second port 240 and the container 170. In another example, the second port 240 may be provided in a directional configuration so as to operate according to a centrifuge principle exhibited by vacuum systems and devices that function to separate dust particles from air.

The third port 244 of the filter assembly 140 can be substantially similar in shape and size as the second port 240. In another example, the second port 240 can be a directional port and the third port 244 may have a different structure without a directional configuration.

Turning to FIG. 2B, the valve body 160 includes a first base 250 and a prong 254 that extends from a valve plate 252 that defines an upper wall of the first base 250. A first valve 260, shown in a closed state in FIG. 2A, includes a first through-port 262 defined in a portion of the partition wall 230 extending in the head 142, and a second through-port 264 defined in the prong 254 of the valve body 160. The prong 254 is configured to move within the upper portion of the second chamber 154, the second intermediate port 238, and the fourth port 222. As shown in FIG. 2A, the first base 250 is configured such that when the first valve 260 is closed, a second valve 270, defined by the second intermediate port 238 and the valve plate 252, is open. More specifically, the valve plate 252 is disposed in the second chamber 154 distanced from the lower wall 234. In addition, with the first valve 260 closed and the second valve 270 open as shown in FIG. 2A, a portion of the first base 250 extends through the third port 244 and past the end face 242 of the lower casing body 146.

As the valve body 160 moves in an upward motion from the first position shown in FIG. 2A, toward the second position shown in FIG. 2B, the second through-port 264 provided by the prong 254 will come into alignment with the first through-port 262. This constitutes an open state of the first valve 260. At the same time, the valve plate 252 atop the first base 250 moves closer to a surface 235 of the lower wall 234 to thereby close the second intermediate port 238, and thus close the second valve 270. As shown in FIG. 2B, in the second position of the valve body 160, the valve plate 252 is pressed into abutment with the lower wall 234 and the fourth port 222 is blocked from being in fluid communication with the second chamber 154 through the second intermediate port 238.

Figure 3:
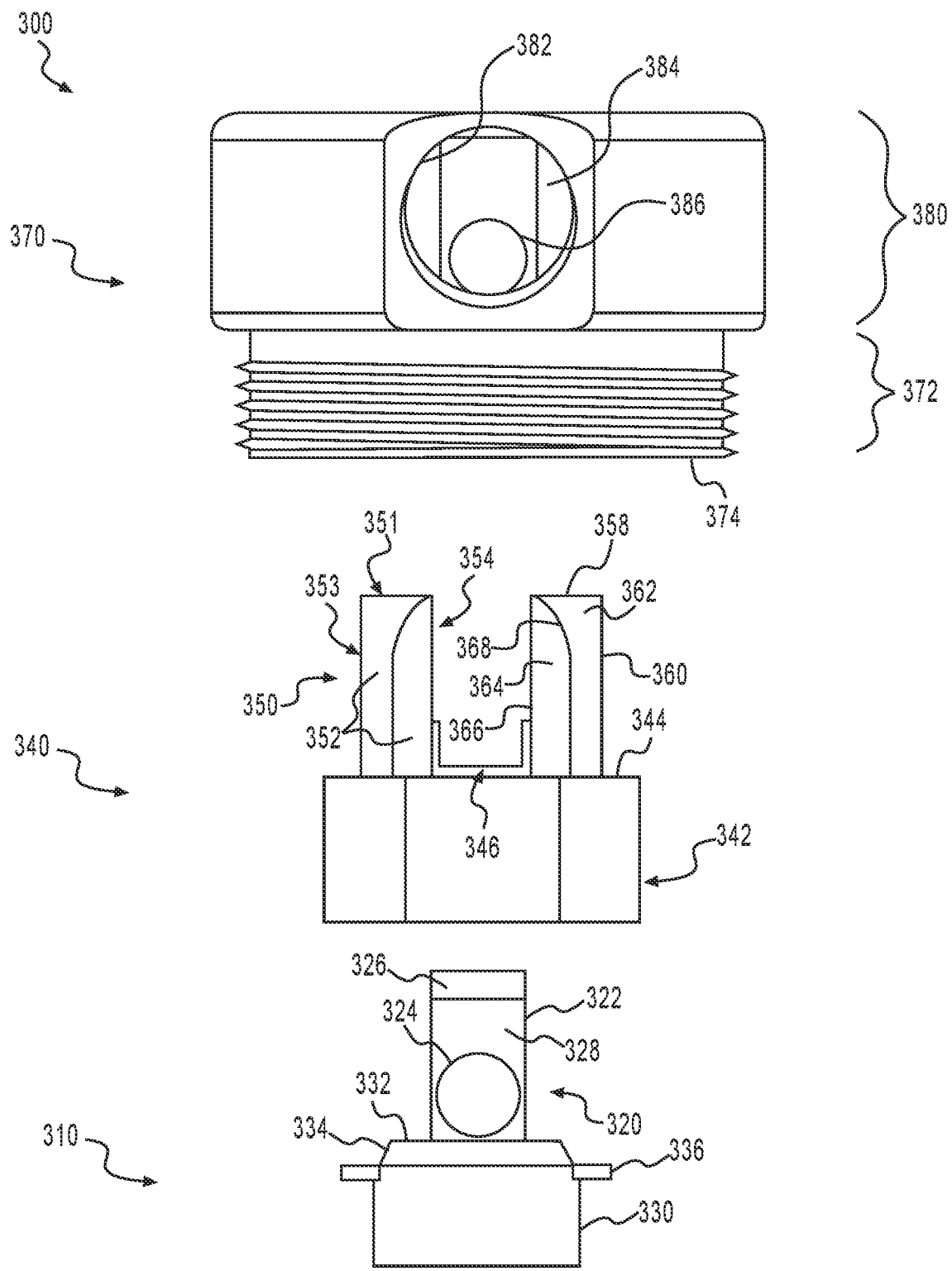
FIG. 3 illustrates an exploded view of an exemplary filter assembly for an oil separator, according to an aspect of the present disclosure.

FIG. 3 illustrates an exploded view of a filter assembly 300 for an exemplary oil separator according to the present disclosure. As shown, the filter assembly 300 includes a valve body 310, a valve guide 340, and a casing 370.

The valve body 310 includes a prong 320 that extends vertically from a first base 330. The prong 320 includes a first longitudinal body having a top edge 326 that in one example may be a chamfered edge. A second through-port 324 for a first valve of the filter assembly 300 is provided with an aperture formed within, or otherwise defined by, the first longitudinal body between the first base 330 and an upper section 328 of the prong 320.

The prong 320 extends from a valve plate 332 that defines an upper inner wall (not shown) and an upper external surface of the first base 330. The first base 330 may be cylindrical or oval shaped to correspond with one or more ports of the casing 370. In one example, an outer edge 334 of the valve plate 332 may have a machined or otherwise shaped profile to correspond with a component or surface in the valve guide 340. The outer edge defines a first sealing face of a second valve 450 (See FIGS. 4A-4D). As shown, first engagement members 336 in the form of protrusions extend from opposite sides of the first base 330 at or just below the valve plate 332.

The valve guide 340 includes a pair of arms 350 that each extend vertically from an upper wall 344 of a second base 342 to a respective upper wall 351. In one example, each arm 350 can be a square or rectangular-shaped body defined by a front wall 352, first and second side walls 353, 354, and a back wall (not shown). In one example illustrated in FIG. 3, a shaped recess is provided within the front wall 352 to provide a stepped profile (see FIGS. 4A-5).

More specifically, each arm 350 includes a second longitudinal body that extends vertically from the second base 342 to a first outer surface 358 defining the upper wall 351 of the arm 350. A second outer surface 360 extends from the back wall (not show) of the arm 350 to a third outer surface 362 that defines one portion of the front wall 352. The second outer surface 360 defines the first side wall 353 of the arm 350.

The front wall 352 of each arm 350 includes a recessed surface 364 that is recessed an appreciable thickness from the third outer surface 362. Together, the third outer surface 362 and the recessed surface 364 make up the front wall 352 of the arm 350. A first inner side surface 366 extends from the back wall (not shown) to the recessed surface 364, and a second inner side surface 368 extends from the recessed surface 364 to the third outer surface 362. Together, the first inner side surface 366 and the second inner side surface 368 define the second side wall 354 of the arm 350.

The pair of arms 350 for the valve guide 340 are connected by a retainer 346 that extends from the first inner side surface 366 of one arm 350 to the first inner side surface 366 of the other arm 350. In one example, the retainer 346 is U-shaped and extends from a plane of the recessed surfaces 364 of the arms 350 towards the back walls (not shown) over a portion of a thickness defined by the first inner side surfaces 366 (see FIG. 5). Together, the retainer 346 and portions of the first inner side surfaces 366 over which the retainer 346 does not extend (in a thickness/depth direction), define a slot 540 (see FIG. 5) configured to receive the prong 320 of the valve guide 340. In one example, the top edge 326 of the prong 320 is provided to help guide the prong 320 behind the retainer 346 and into and through the slot 540 when the filter assembly 300 is assembled. During operation, the retainer 346 and first inner side surfaces 366 guide vertical movement of the prong 320.

The casing 370 of the filter assembly 300 includes a head 380 and a lower casing body 372. A fourth port 382 provides an outlet for the filter assembly 300. The fourth port 382 is provided in a side of the head 380 opposite to a side that includes a first port 510 (see FIG. 5) that defines an inlet of the filter assembly 300. A partition wall 384 extends from an upper wall of the head 380, to an end face 374 of the lower casing body 372. In one example, the partition wall 384 may provide a first through-port 386 of a first valve with an aperture defined therein. In other examples, a recessed slot may also be defined in a portion of the partition wall 384 to receive the prong 320 of the valve body 310.

FIGS. 4A and 4B respectively illustrate side elevation views of an outlet of the filter assembly 300. FIGS. 4C and 4D illustrate sectional views of the exemplary filter assembly 300 of FIGS. 4A and 4B, respectively taken along section lines 4-4. More specifically, a location of the section line 4-4 along an axis orthogonal thereto (i.e., a horizontal axis perpendicular to a longitudinal axis of the prong 320), is between the recessed surface 364 and the third outer surface 362 of the valve guide 340 (e.g., a location in front of the retainer 346 but behind the third outer surface 362). Furthermore, the view illustrated in FIGS. 4C and 4D is from the location described above, looking out of the fourth port 382 of the filter assembly 300 (also referred to as "looking out of the page").

With reference to FIGS. 4A and 4C, the valve body 310 is in a first position such that a first valve 400 is closed. As shown, the first through-port 386 (show in phantom) in the partition wall 384 is completely covered by the upper portion 328 of the prong 320 that extends between a top of the second through-port 324 (shown in phantom) and the top edge 326. In this operational state, fluid entering through a second chamber 430 defined by the lower casing body 372, will be directed past the first base 330 of the valve body 310, through a second intermediate port 420, and into a path of the fourth port 382. In one example, the fluid is conveyed to a front (lower) edge of the second intermediate port 420, by way of entering a space surrounded by a first inner guide surface 440 of the valve guide 340.

The second intermediate port 420 and the valve plate 322 defines a second valve 450 of the filter assembly 300. When the second valve 450 is open, contaminants may collect in a container that may be attached to a threaded portion of the lower casing body 372, and filtered fluid may be conveyed to the fourth port 382.

As illustrated in FIG. 4C, in the first position, the first engagement members 336 of the valve body 310 rest on second engagement members 460 of the valve guide 340 that extend inwardly from the first inner guide surface 440 of the second base 342. In one example, the first inner guide surface 440 is provided by a first vertically extending wall that defines an inner chamber configured to accommodate the first base 330 of the valve body 310, and movement of the first base 330 therein. The inner chamber is further defined by a second inner guide surface 442 of the valve guide 340 that extends laterally between the second base 342 and the arms 350. The second inner guide surface 442 defines a first valve stop (hereafter referred to as "second inner guide surface 442" or "first valve stop 442") for the valve body 310.

The first valve stop 442 extends outwardly from a third inner guide surface 444 of the valve guide 340 that extends in a vertical direction. As shown, the first valve stop 442 is an annular surface disposed inward of an outermost annular segment of the upper wall 344 of the second base 342. As shown in FIGS. 4C and 4D, a step is defined by a portion of the upper wall 344 that is outward of the arms 350 and the first valve stop 442.

The third inner guide surface 444 defines the second intermediate port 420 and a second sealing face of the second valve 450. In one example, the third inner guide surface 444 is chamfered or otherwise configured to substantially correspond to the outer edge 334 of the valve plate 332 of the valve body 310. In one example, with sufficient upward movement of the valve body 310, the third inner guide surface 444 is configured to receive the valve plate 332 to be in sealing contact with the outer edge 334 as shown in FIG. 4D. As such, the third inner guide surface 444, the valve plate 332, and the outer edge 334 of the valve plate 332 define the second valve 450 of the filter assembly 300.

In another example, the third inner guide surface 444 may be configured to halt the upward movement of the first base 330, and thus the valve body 310. In addition, bottom edges 452 of a portion of the front wall 352 defined by the second inner side surface 368 can provide a second valve stop (hereafter referred to as "bottom edges 452" or "second valve stop 452"). These bottom edges 452 extend inwardly relative to the second side walls 354 of the arms 350 a sufficient amount to overlap with a portion the valve plate 332 inside of a top of the outer edge 334 (innermost diameter of the top edge 334) as shown in FIG. 4D.

A third valve stop is provided by the first engagement members 336 extending from the first base 330 of the valve body 310 and the second engagement members 460 of the valve guide 340. The third valve stop limits second valve 450 opening movement of the valve body 310 within the valve guide 340. More specifically, the first engagement members 336 rest on the second engagement members 460 when the valve body 310 is in the first position as shown in FIG. 4C. Further, the second engagement members 460 function to retain the valve body 310 with the valve guide 340. In one exampled, the second engagement members 460 may be provided in the form of notches extending inward from the first inner guide surface 440. In another example, the second engagement members 460 may includes chamfered edges 462. The chamfered edges 462 may contact the first engagement members 336 and guide the valve body 310 into the valve guide 340 as part of an assembling of the filter assembly 300.

With reference to FIGS. 4B and 4D, the valve body 310 is in a second position such that the first valve 410 is open. As shown, the upper portion 328 of the first longitudinal body is disposed above the first through-port 386 with which the second through-port 324 is aligned. In this operational state, fluid will stopped from passing through the second chamber 430 to the second intermediate port 420, but rather pass from the first port 510 through to the fourth port 382. That is the first valve 410 will be open whereas the second valve 450 defined by the valve plate 332, the outer edge 334, and the third inner guide surface 444, will close the fourth port 382 from being in fluid communication with the second chamber 430. The second intermediate port 420 defines, in part, the second valve 450 of the filter assembly 300 that when open, allows for contaminants to collect in a container that may be attached to a threaded portion of the lower casing body 372.

Figure 5:
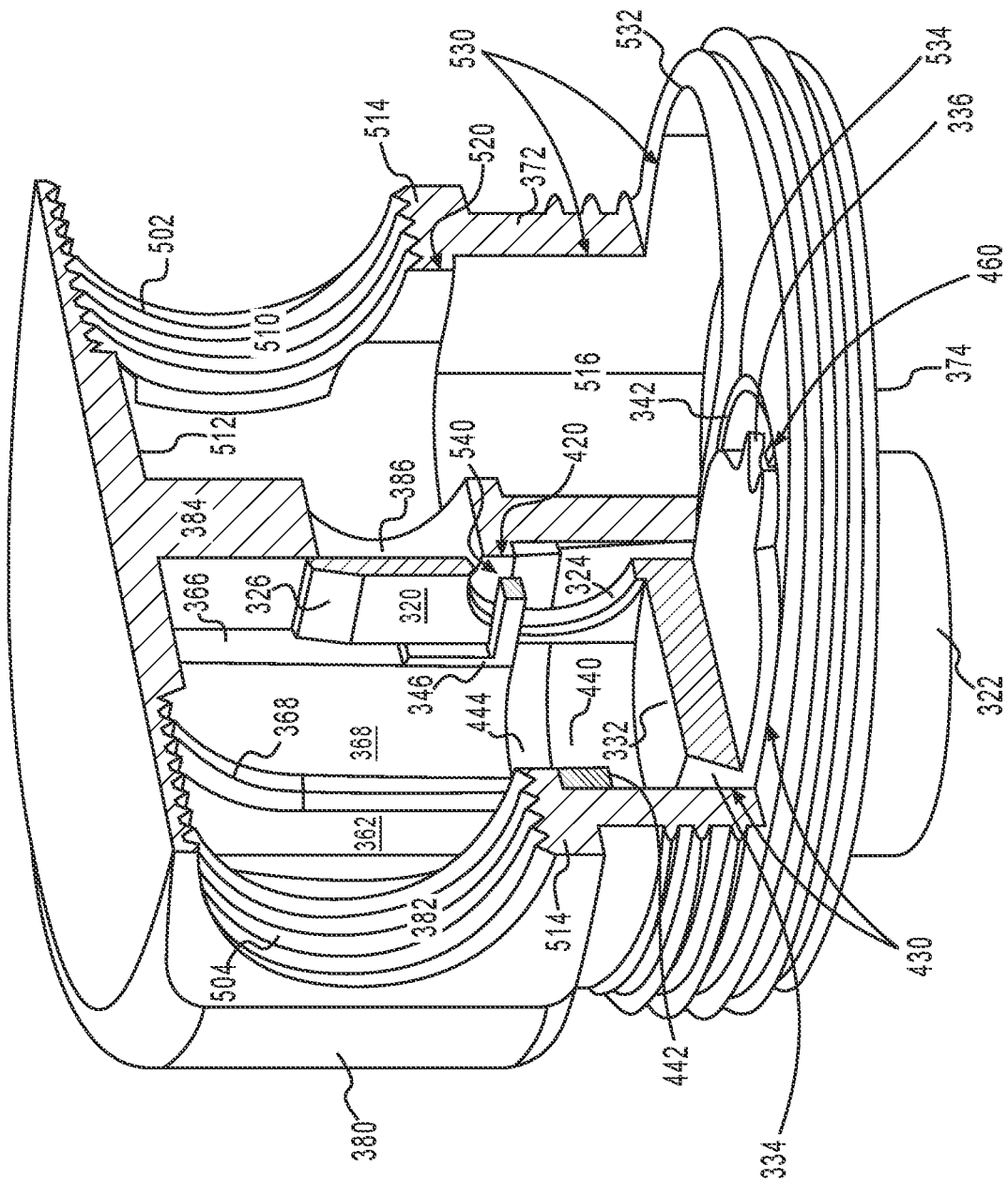
FIG. 5 illustrates a partial sectional isometric view of a filter assembly of an oil separator, according to an aspect of the present disclosure.

FIG. 5 illustrates a partial sectional isometric view of the filter assembly 300 of an exemplary oil separator, according to an aspect of the present disclosure. As shown, the head 380 of the filter assembly 300 includes a first fitting 502 and a second fitting 504 within which the first and fourth ports 510, 382 are respectively defined. Each of the first and second fittings 502, 504 may be configured to engage with a respective hose connector.

The head 380 is formed as a substantially cylindrical body and defines the partition wall 384 that extends from an upper wall 512 past a lower wall 514 of the head 380. The second intermediate port 420 is defined between the partition wall 384 and the lower wall 514. The second intermediate port 420 is configured to be in fluid communication with the forth port 382 and the second chamber 430. On the opposite side of the partition wall 384 from the second intermediate port 420, a first intermediate port 520 is defined to be in fluid communication with a first chamber 530 and the first port 510. In one example, a filtering element may be disposed in the first intermediate port 520, instead of or in addition to, a filtering element 610 (see FIG. 6) provided at a second port 532.

As shown, the lower casing body 372 extends from the lower wall 514 of the head 380. An inner wall 516 of the lower casing body 372 defines the first and second chambers 530, 430 on opposite sides of the partition wall 384. An outer surface of the lower casing body 372 includes a threaded portion configured to engage with a corresponding engagement surface of a container (not shown).

Second and third ports 532, 534 are defined in an end face 374 (see FIG. 6) of the lower casing body 372. The third port 534 is in communication with the second chamber 430 and configured to receive the second base 342 of the valve guide 340. The third port 534 can be substantially similar in shape and size as the second port 532. On the other hand, as in other examples described herein, the second port 532 may be provided as a directional port, and the third port may not be provided with a directional port configuration.

In one example, the valve guide 340 and valve body 310 may be removable and reinstall-able in the filter assembly 300. In this example, the second port 532 and the first chamber 530 could have the same configurations as the second chamber 430 and the third port 534. Thus, the valve guide 340 and valve body 310 could removed from the second chamber 430 and be re-installed in the first chamber 530. As a result, fluid entering the first port 510 may pass through the filtering element (not shown), extracted contaminants may exit through the second port 532 and collect in a container, and filtered fluid can pass through the third port 534. This may continue until the self-regulating valve body 310 moves into abutment with the third inner guide surface 444 and the first intermediate port 520 is closed. In this configuration, the first intermediate port 520 defines a portion of the second valve 450.

As shown, the valve body 310 includes the first base 330 and the prong 320 extending from the valve plate 332, which defines an upper wall of the first base 330. The first valve 410 includes the first through-port 386 defined in the partition wall 384 and the second through-port 324 defined in the prong 320 of the valve body 310. As illustrated in FIG. 5, the valve body 310 is in the first position and the upper portion 328 of the prong 320 is covering the first through-port 386 such that the first valve 410 is in a closed state.

The first base 330 is configured such that when the first valve 410 is closed, the second valve 450 is open. More specifically, the valve plate 332 is disposed in the second chamber 430 distanced from the first valve stop 442. As the valve body 310 moves in an upward motion from the first position shown in FIG. 5, the second through-port 324 provided by the prong 320 will come into alignment with the first through-port 386. At the same time, the valve plate 332 atop the first base 330 will move closer to the third inner guide surface 444 to close the second valve 450.

The valve body 310 is in the first position in FIG. 5 such that the first valve 410 is closed. The first through-port 386 in the partition wall 384 is completely covered by the upper portion 328 of the prong 320 that extends between a top of the second through-port 324 and the top edge 326. The first engagement members 336 of the valve body 310 rest on the second engagement members 460 of the valve guide 340 as shown. The prong 320 is configured to move within the fourth port 382, the second intermediate port 420, and an upper portion of the second chamber 430 in a space between the partition wall 384 and the retainer 346. The prong 320 may be in sliding abutment with first inner side surface 366 of the arm 350.

In one example, the second engagement members 460 extend inwardly from the first inner guide surface 440 as notches with chamfered edges. The first engagement members 336 may be formed as protrusions that include cutouts. Locations of the protrusions on the first base 330 may correspond to locations of the notches on the second base, and the cutouts in the protrusions may correspond to the chamfered edges. In this example, walls defining the cutouts could be moved against the chamfered edges to snap the valve body into the valve guide. In another example, the first engagement members may be provided as outwardly extending notches, and the second engagement members may be inwardly extending protrusions with cutout sections corresponding to the notches.

In another example, the second engagement members 460 are sufficiently deep and long (angular length) enough to define a surface area that is greater than a surface of the first engagement members 336. In another example, the second engagement members 460 could be provided in the form of an annular lip extending from first inner guide surface 440 so as to surround the first base 330. In another example, breaks in an annular lip may be for to allow the first engagement members 336 to pass before the valve body 310 is rotated so the first engagement members rest on the segmented annular lip.

FIG. 5 provides another view of the first valve stop 442, the third inner guide surface 444, and the top edge 326 of the valve guide 340. The first valve stop 442 extends outwardly from the third inner guide surface 444 that is configured to substantially correspond to the outer edge 334 of the valve plate 332 of the valve body 310.

Figure 6:
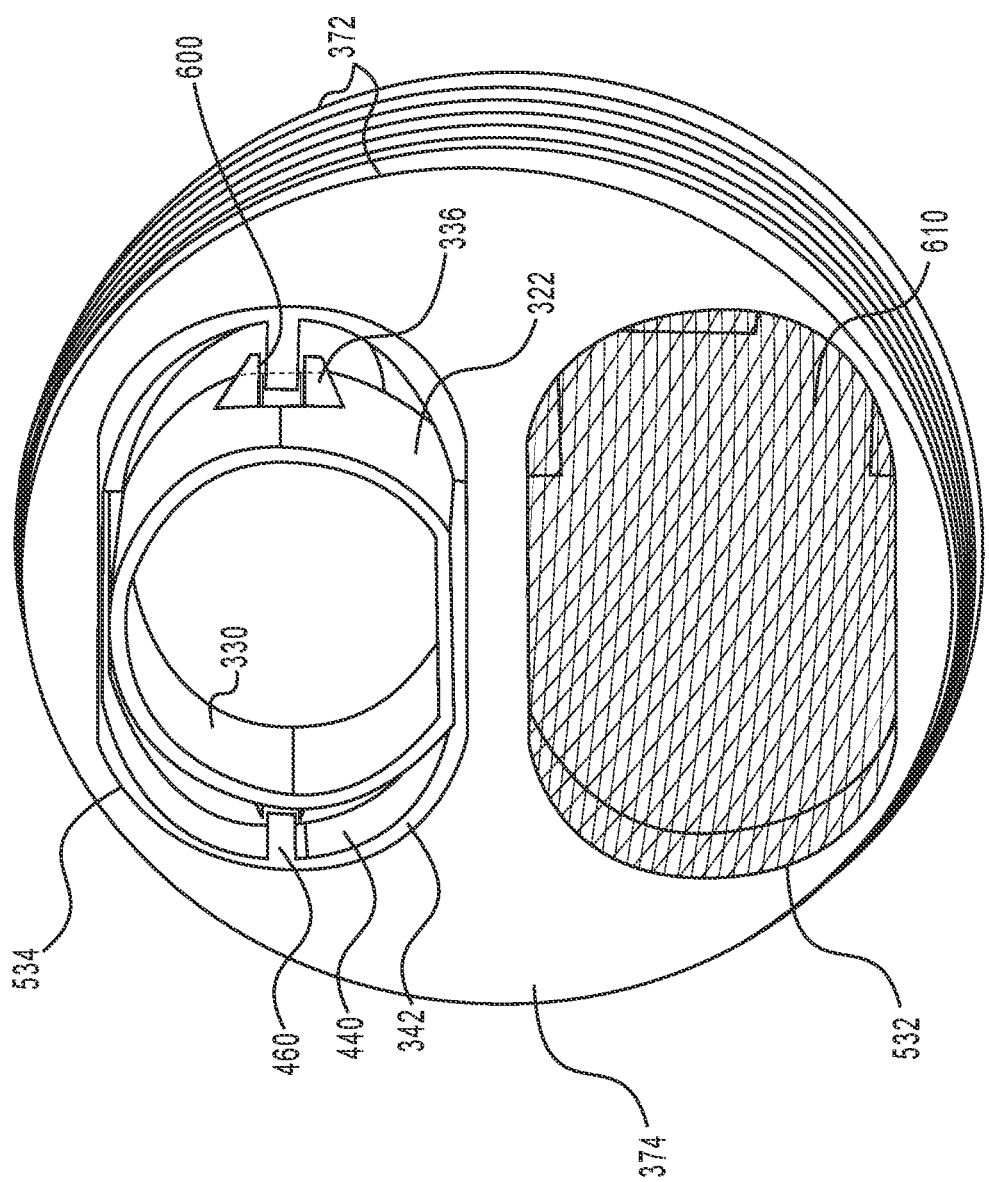
FIG. 6 illustrates a bottom perspective view of the filter assembly of FIG. 5.

FIG. 6 illustrates a bottom perspective view of the filter assembly of FIG. 5 that shows the end face 374 of the lower casing body 372. As shown, the second base 342 is received in the third port 534 of the filter assembly 300, and the first base 330 of the valve body 310 is disposed within the second base 342. The first engagement members 336 extend from the first base 330 and include cutouts 600 configured to receive and move past edges of notches that define the second engagement members 460 extending from the first inner guide surface 440.

FIG. 7A illustrates an exemplary oil separator 700, according to an aspect of the present disclosure. The oil separator 700 includes a filter assembly 710 and a container 720. The filter assembly 710 may be provided by any of the exemplary filter assemblies described herein. The container 720 may be equipped with a vertically extending rectangular aperture in which glass or translucent plastic is provided so as to form a window 722. A seal between the container 720 and the glass or plastic ensures the container 720 does not leak around the window 722. In this example, the window 722 may provide a user with a convenient way to check a liquid level within the container that does not involve removing the container from the filter assembly 710.

FIG. 7B illustrates an exemplary oil separator 750, according to an aspect of the present disclosure. The oil separator 750 of FIG. 7B is equipped with a level sensor in either or both of a filter assembly 710 and a container 760. The sensor 762 may include an optical encoder, electronic float, weight sensor, hall sensor, ultrasonic sensor, and other types of sensors known in the art. The sensor 762 may communicate with an electronic control unit 770 ("ECU 770") of a vehicle in which the oil separator 750 is installed. Communication may be facilitated by a hardwire connection or a wireless connection (e.g., Bluetooth, WiFi, NFC). Accordingly, a vehicle user may be able to operate the ECU to check and report on-demand, a liquid level or percentage of total volumetric capacity of liquid in the container 760.

FIGS. 8A and 8B illustrate an exemplary oil separator 800 in first and second operational states, according to an aspect of the present disclosure. The oil separator 800 includes a casing 810 and a container 820, and is substantially similar to the exemplary oil separators described herein with the exception that a valve body 830 is positioned in a first chamber and extends through a filter element 832.

In one example, a float and block system may be incorporated in an exemplary oil separator according to the present disclosure, as illustrated in FIGS. 9A-10B. This approach has an advantage over existing air oil separators and catch cans on the market. When those devices become full of fluid, there is a high risk of potential hydro-lock in a hard turn. In addition, there may be increased emissions due to liquid oil being delivered to the intake manifold—the liquid oil being much more difficult to burn than a vapor and more likely to foul a catalytic converter.

Figures 9A, 9B:
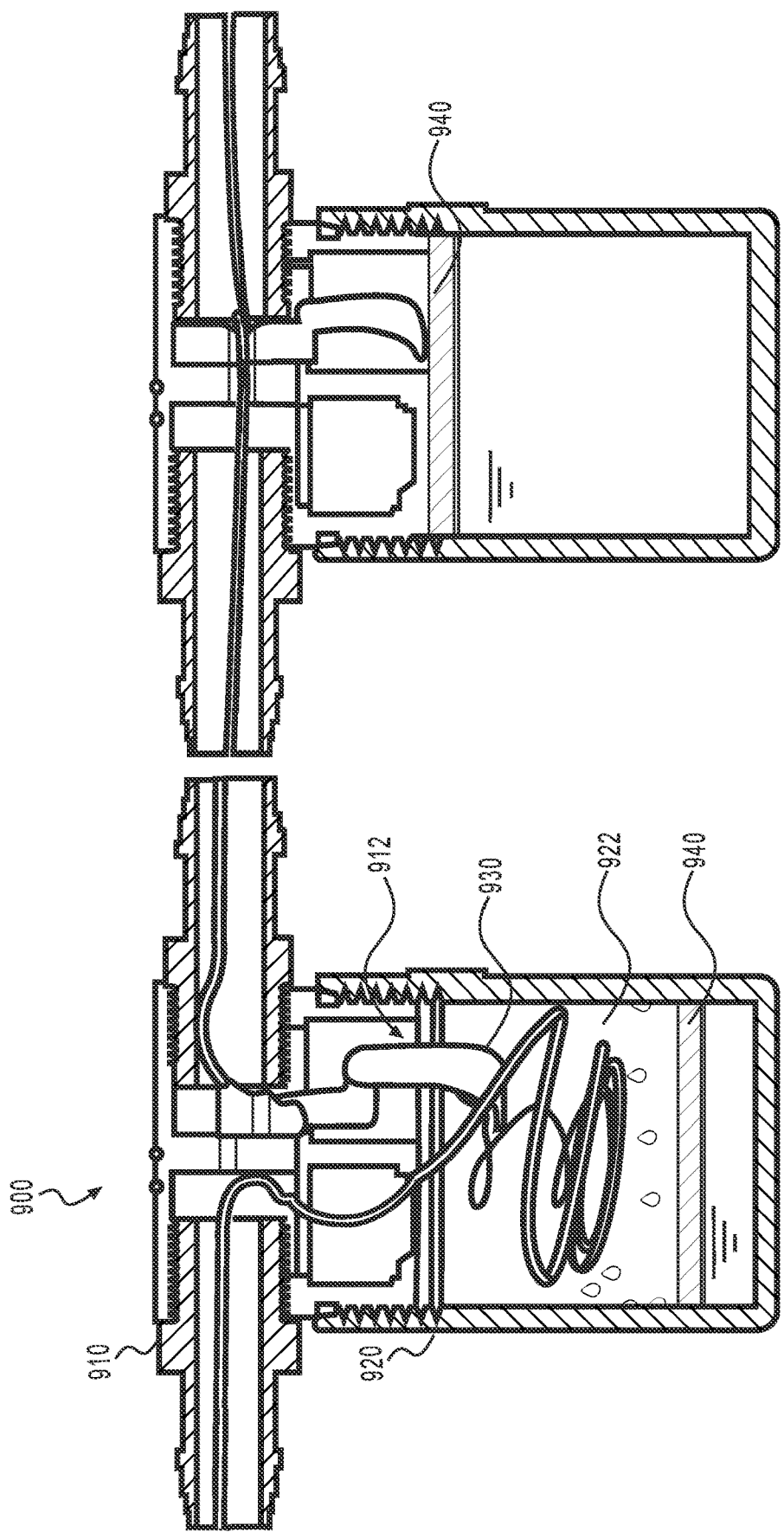
FIGS. 9A and 9B illustrate an exemplary oil separator in first and second operational states, according to an aspect of the present disclosure.
Figure 10B:
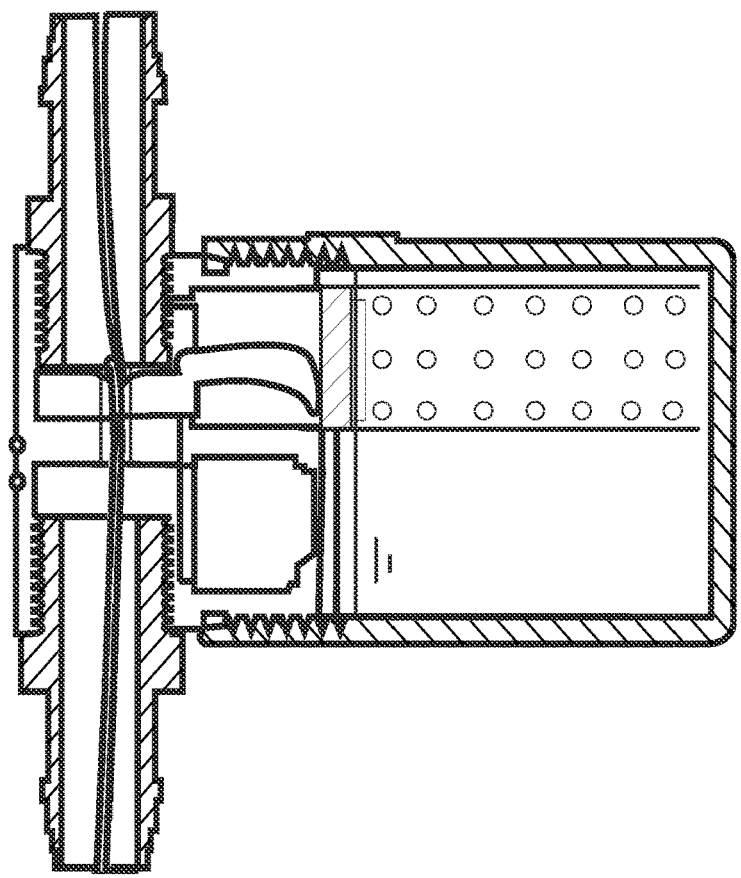
FIGS. 10A and 10B illustrate an exemplary oil separator in first and second operational states, according to an aspect of the present disclosure.

With the exemplary oil separators illustrated in FIGS. 9A through 10B, a float (940, 1040) rises up to seal liquid in a container. As a result, the float (940, 1040) can better prevent collected liquid contaminants consumption in case of an accident, travel on a bumpy road, or a lateral force (such as turning or braking), than other devices that do not incorporate the exemplary filter assemblies described herein. As shown in FIGS. 9B and 10B, the float (940, 1040) can also operate to push a valve body upward and open a first valve provided by first and second through ports. Thus, the float (940, 1040) can operate as part of an implementation of a bypass configuration for the oil separators described herein.

FIGS. 9A and 9B illustrate an exemplary oil separator 900 that includes a float 940, according to an aspect of the present disclosure. In one example, the float 940 may sufficiently correspond in shape and size to an inner surface 922 of a container 920. Thus, the float 940 can be pressed against and assist in moving a valve body 930 with continued accumulation of liquid in the container 920. In another example, the float 940 may be sized smaller than a shape (e.g., circle) defined by the inner surface 922. In this example, the float 940 may be of sufficient size that the float always blocks a third port 912 of a filter assembly 300 when the container 920 is filled with a predetermined volume of liquid.

Figure 10A:
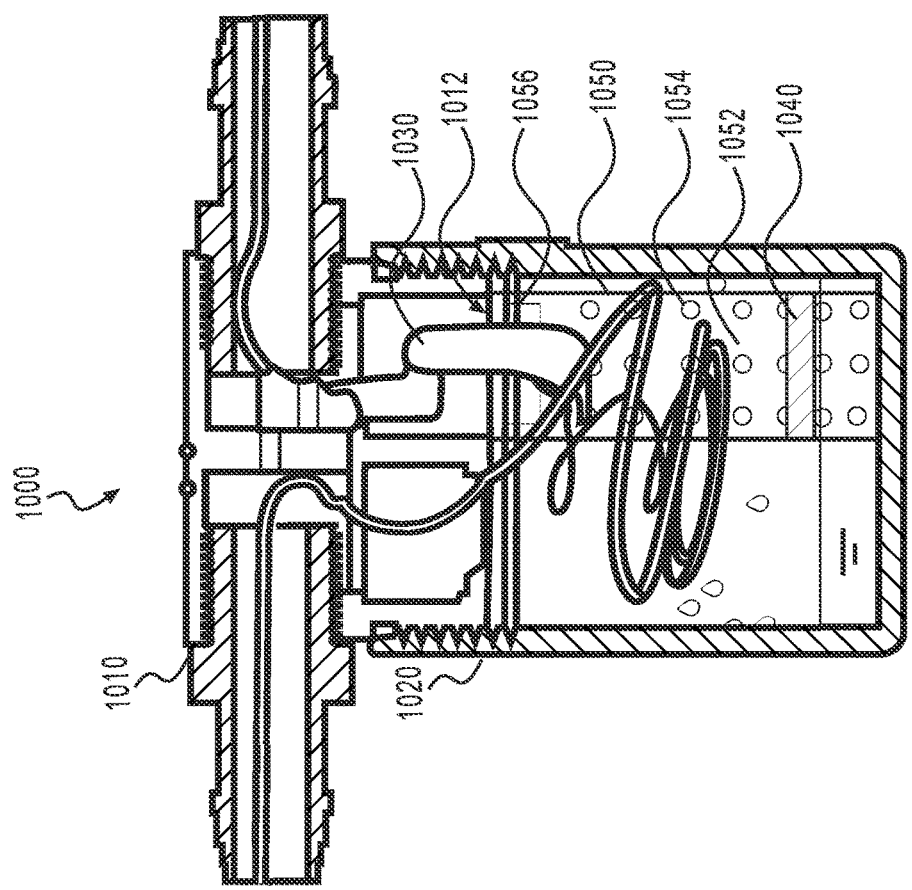

FIGS. 10A and 10B illustrate an exemplary oil separator 1000 that includes a float 1040, according to an aspect of the present disclosure. A valve body 1030 is disposed and moves within a second chamber of a filter assembly. The float 1040 is disposed in a cage 1050 that extends vertically within the container 1020. In one example, a cross-section of the cage 1050 may substantially correspond to a shape of a third port 1012 of a filter assembly 1010. In another example, the cage 1050 may differ from the shape of the third port 1012, but be of a size and shape to surround the third port 1012. In this example, a shape of the float may substantially correspond to a cross-section of the cage 1050 so that the third port 1012 is substantially blocked by the float 1040 when it is immediately below the third port 1012.

In one example, a wall 1052 of the cage 1050 may be formed with first apertures 1054 and second apertures 1056. As shown, the first apertures 1054 may be provided in a lower section of the cage 1050 so that liquid can enter the cage 1050 and displace the float 1040. On the other hand, the second apertures 1056 are provided in an upper portion of the cage 1050 so that filtered fluid can exit the container through the third port 1012. When the container 1010 is filled with a volume of liquid that causes the float 1040 to be pressed against an end face of the filter assembly 1010, the float 1040 will cover the second apertures. In this operational state shown in FIG. 10B, filtered fluid or liquid will not be allowed to enter a second chamber and/or exit the oil separator 1000 through an outlet.

In one example, the cage 1050 may be attached to a bottom surface of the container 1020. In another example, the cage 1050 may be attached to the filter assembly 300 and positioned within the container 1020 when the filter assembly 1010 is secured to the container 1020.

Filtering elements have been omitted from FIGS. 9A through 10B. However, it will be understood that each of the oil separators illustrated in FIGS. 9A through 10B may include a filtering element positioned in any of the locations described herein.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. An oil separator suitable for use with an internal combustion engine, the oil separator comprising:
   a container having a first end that is open and a second end that is closed, the container defining a reservoir between the first end and the second end; and
   a filter assembly secured to the first end of the container, wherein the filter assembly includes:
      a casing including: a head, an end face, a lower casing body extending between the head and the end face, and a partition wall, the lower casing body defining a first chamber and a second chamber on opposite sides of the partition wall;
      a valve body disposed in one of the first chamber and the second chamber, the valve body including a base, a prong extending from the base, and first engagement members,
      wherein the valve body is configured to move within the filter assembly from a first position to a second position to open a first valve defined in the head of the casing, and
   wherein the first valve is closed by the prong in the first position such that the reservoir is in fluid communication with an inlet of the oil separator through a port defined in the end face of the filter assembly,
   wherein the valve body includes a first sealing face that surrounds the prong,
   wherein a valve guide includes a second sealing face,
   wherein the first sealing face is configured to abut the second sealing face in the second position and close a second valve of the filter assembly, and
   wherein the second valve is provided between the port defined in the end face and one of the inlet and an outlet of the filter assembly.

2. The oil separator of claim 1,
   wherein the first valve includes a first through-port defined in the partition wall and a second through-port defined in the prong,
   wherein the second through-port is aligned with the first through-port in the second position for an open state of the first valve, and
   wherein the inlet is in fluid communication with an outlet of the oil separator through the first valve in the open state.

3. The oil separator of claim 1, wherein the port defined in the end face is configured as a directional port disposed between the reservoir and the first chamber, and wherein the port directs fluid toward an interior wall of the container defining the reservoir.

4. The oil separator of claim 1, further comprising:
   the valve guide positioned in the one of the first chamber and the second chamber, the valve guide including second engagement members extending along a longitudinal axis of the casing; and
   wherein movement of the valve body within the filter assembly from the first position to the second position is guided by an engagement between the first and second engagement members.

5. The oil separator of claim 1, further comprising a filtering element positioned in the filtering assembly between the inlet and the reservoir, wherein the filtering element includes a mesh element formed of a metal material.

6. The oil separator of claim 1, wherein the port defined in the end face is a first port, and wherein the filter assembly includes a second port defined in the end face, and wherein the first and second ports are open to the reservoir.

7. The oil separator of claim 2, wherein the inlet and a first port are in communication with the first chamber, and an outlet of the oil separator and a second port in communication with the second chamber.

8. The oil separator of claim 1, wherein the first valve is closed relative to the one of the first chamber and the second chamber with the valve body in the first position and the second position.

* * * * *